2,866,787

9,9-DIOXY-10-(2,3-BISPIPERIDINO-1-PROPYL) PHENOTHIAZINE

Raymond Jacques Horclois, Malakoff, France, assignor to Societe des Usines Chimiques Rhone-Poulenc, Paris, France, a French body corporate No Drawing. Application December 13, 1956
Serial No. 628,003

Claims priority, application France November 4, 1954

1 Claim. (Cl. 260—243)

This invention relates generally to organic chemical compounds useful in chemotherapy and, more particularly, the invention is concerned with certain new phenthiazine derivatives that are found unexpectedly to possess interesting and valuable therapeutic properties, particularly those of local anaesthetics.

It is known that certain derivatives of phenthiazine are useful as local anaesthetic agents. It is known further that the potency and duration of action of a local anaesthetic agent are determined by its chemical configuration which moreover influences physical factors upon which anaesthesia depends, particularly its diffusibility into neural tissues. Extensive research and experimentation, together with clinical experience, have indicated that the magnitude of the therapeutic index and the nature of the therapeutic effects exhibited by certain phenthiazine compounds can be radically changed or even eliminated by small modifications in the molecular structure of the compounds. This particularly is true of local anaesthetics, for in this field it is well known that relatively slight modifications in molecular structure may alter considerably the pharmacologic behaviour of a drug. This may readily be illustrated by reference to the local anaesthetic procaine (the 2-diethylaminoethyl ester of para-aminobenzoic acid) which, although not a phenthiazine derivative, shows clearly the effect of changes in its chemical structure relative to its pharmacologic behaviour. In this instance, if the ethyl groups of the tertiary nitrogen atom of procaine are replaced by methyl groups and a hydrogen atom of the primary amino group substituent to the aromatic nucleus is replaced with a butyl group, the resultant homologue has a local anaesthetic potency 10-fold that of procaine and the duration of its action is doubled. It follows, therefore, that the pharmacologic behaviour of members of a homologous series, one of which is a local anaesthetic, cannot be forecast by mere reference to the molecular configuration of the individual homologues. Among the 10-aminoalkyl phenthiazines this lack of predictability of the pharmacological behaviour of homologues is found to be especially evident and wide variations in the properties of members of a homologous series are observed, particularly with variations in the nature and length of the 10-position substituent group.

Regarded in certain of its broader aspects, the novel subject matter of the present invention comprises the organic nitrogenous bases represented by the general formula:

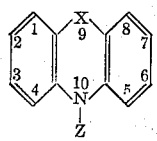

wherein X is a divalent radical selected from the group consisting of thio, sulfinyl, and sulfonyl; and, where X is thio, Z is a radical of the formula —CH$_2$CHMCH$_2$M, M being a heterocyclic tertiary amino radical, and, when X is sulfinyl or sulfonyl, Z is an alkyl radical comprising 3 carbon atoms, that bears on different carbon atoms two tertiary amino substituents of identical chemical structure. The invention comprises, also, acid addition salts and quaternary ammonium salts of said bases as hereinafter defined.

Regarded in certain more limited aspects, a more restricted group of the novel compounds according to this invention comprises the organic nitrogenous bases of the above general formula, and salts thereof as hereinafter defined, wherein X has the significance assigned above and Z is a radical of the formula:

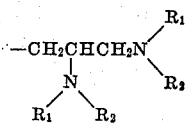

where X is chosen from sulfinyl and sulfonyl, R$_1$ and R$_2$ each represent alkyl of 1 to 4 carbon atoms, or where X is chosen from thio, sulfinyl and sulfonyl represent, with the nitrogen atom to which they are attached, a member of the group formed by the radicals pyrrolidino, piperidino, 2-methylpiperidino, hexamethyleneimino, morpholino, piperazino and 4-alkylpiperazino (the alkyl radical containing 1 to 4 carbon atoms). More specifically, the presently preferred compounds of this invention are the organic nitrogenous bases of the above general formula wherein Z is a radical selected from the class consisting of 2,3-bispiperidinopropyl and 2,3-bis(dimethylamino)propyl.

The novel compounds of this invention are useful chemotherapeutic agents having valuable pharmacodynamic properties, particularly for producing ganglioplegic, local anaesthetic and spasmolytic effects. These compounds, in varying minor degrees, possess antihistaminic activity, although this activity is of academic interest rather than of clinical importance, the compounds being important chiefly as local anaesthetics. The compounds of the present invention may be distinguished from previously known phenthiazine derivatives, in that they possess the following properties (to a marked degree) generally acknowledged to be necessary characteristics of a good local anaesthetic: (1) strong local anaesthetic power by infiltration and by contact, (2) weak vasodilatory properties, (3) weak adrenolytic action, (4) reduced action on the central and peripheral nervous systems, and (5) good local tolerance.

The organic nitrogenous bases of this invention are poorly soluble in water but easily dissolve in lipoids and organic solvents; they may be used in preparation of ointments and oily solutions of the types customarily employed for prolonged anaesthesia. Being organic nitrogenous bases by virtue of one or more amino nitrogen groups in the molecular structure, they react readily with mineral and organic acids to form acid addition salts, such as hydrohalides, especially hydrochlorides, acetates, 8-chlorotheophyllinates and the like. The bases react, also, with alkyl and aralkyl halides, such as methyl iodide, and other reactive esters to form quaternary ammonium salts. Salts of both types, the acid addition and the quaternary ammonium salts, although being substantially lipoid insoluble, are readily water soluble and, provided the anions and cations are pharmaceutically acceptable, are the therapeutic forms of choice of the compounds of this invention. The term salts of the organic bases of this invention is employed herein in this limited significance.

The novel compounds of this invention may be prepared, at choice, by any of several routes of synthesis, including the following methods:

(1) Interaction of a selected phenthiazine with a suitable bis-(tertiaryamino)alkyl halide according to the reaction generally indicated as follows:

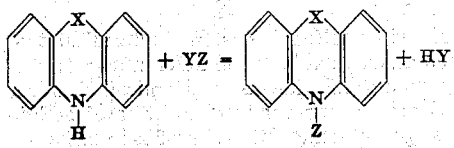

Y=halogen, and X and Z have the significance above assigned.

(2) Interaction of a selected N-bis(halo)alkyl phenthiazine with a suitable secondary amine according to the reaction generally indicated as follows:

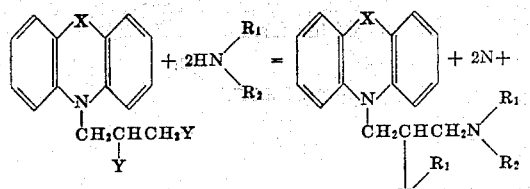

or

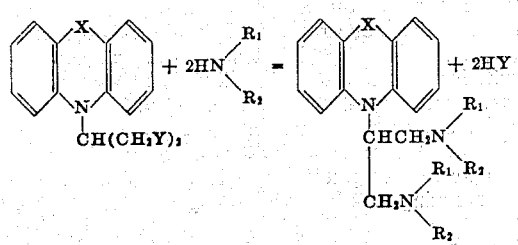

wherein X, Y, $R_1$ and $R_2$ have the significance above assigned.

Other routes for synthesis of the novel compounds of this invention will be apparent to those versed in the field of chemistry to which the invention relates.

This application is continuation-in-part of co-pending application Serial No. 544,021 of the same applicant filed October 31, 1955, now abandoned, and entitled "Phenthiazine Derivatives."

To facilitate a fuller and more complete understanding of the subject matter of this invention, certain specific examples herewith follow, provided by way of illustration merely and not by way of limitation on the scope of this invention as defined by the subjoined claim. The melting points have been determined on the Kofler block.

*Example I*

About 30.3 grams of 9,9-dioxyphenthiazine, which may be obtained by treatment of phenthiazine with a strong oxidising agent such as chromic oxide or the like, is dissolved in 200 cubic centimeters of dimethylformamide, 11.5 grams of potassium ethylate is added and the mixture is distilled until the temperature of the distillate remains constant at about 150° C. A solution of approximately 40 grams of 1,3-bispiperidino-2-chloro-propane in 75 cubic centimeters of dimethylformamide then is added and the mixture is heated under reflux for about 10 hours. Then it is poured into water, extracted with chloroform, the chloroform extract is dried over anhydrous potassium carbonate and the solvent is evaporated to yield a residue which is purified by crystallisation from ethanol. There is thus obtained about 37 grams of 9,9-dioxy-10-(2,3-bispiperidino-1-propyl)phenthiazine which is found to melt at 206° C.

*Example II*

About 11 grams of 10-[2,3-bis(dimethylamino)-1-propyl]-phenthiazine is dissolved in 50 cubic centimeters of glacial acetic acid, 2 cubic centimeters of pure sulphuric acid ($d=1.83$) is added, the mixture is agitated and cooled to 10°–15° C., and 3.1 cubic centimeters of a solution of hydrogen peroxide (containing 38 grams of $H_2O_2$ per 100 cubic centimeters) in 15 cubic centimeters of glacial acetic acid is added during a period of ½ hour. Agitation of the mixture is continued for 3 hours, then it is left to stand overnight at 20° C. On the following morning about 100 cubic centimeters of water is added, followed by 50 cubic centimeters of aqueous sodium hydroxide solution ($d=1.33$) with cooling and agitation. After extraction with 50 cubic centimeters of chloroform and drying the extract over sodium sulphate, the solvent is evaporated and the desired reaction product is recovered and then crystallised from 90 cubic centimeters of heptane. There is thus obtained about 7 grams of 9-oxy-10-[2,3-bis(dimethylamino)-1-propyl]phenthiazine, which is found to melt at 120° C. The following compounds may be prepared similarly:

9 - oxy - 10 - [2,3 - bis(diethylamino) - 1 - propyl]phenthiazine, M. P. 95° C.

9 - oxy - 10 - (2,3 - bispiperidino - 1 - propyl)phenthiazine, M. P. 145° C.

9 - oxy - 10 - [2,3 - bis(2 - methylpiperidino) - 1 - propyl] phenthiazine, M. P. 175° C.

9 - oxy - 10 - (2,3 - bis - pyrrolidino - 1 - propyl)phenthiazine, M. P. 132° C.

9 - oxy - 10 - (2,3 - bis - morpholino - 1 - propyl)phenthiazine, M. P. 198° C.

9 - oxy - 10 - (2,3 - bis - hexamethyleneimino - 1 - propyl) phenthiazine, M. P. 170° C.

*Example III*

Approximately 2 grams of 9-oxy-10-[2,3-bis(dimethylamino)-1-propyl]phenthiazine is heated for 3 hours under reflux with 15 grams of ethyl iodide; the excess ethyl iodide is distilled off and the residue is washed with acetone. The crude product so obtained is recrystallised from 35 cubic centimeters of isopropanol, giving about 1.4 grams of 9-oxy-10-[2,3-bis(dimethylamino)-1-propyl] phenthiazine monoethiodide, which is found to melt at 210° C.

*Example IV*

About 10 grams of phenthiazine is heated under reflux for 2 hours with 100 cubic centimeters of xylene and 2.3 grams of sodamide. A solution containing 13.7 grams of 1,3-bispiperidino-2-chloro-propane in 96 cubic centimeters of xylene is added over a period of 1 hour and the mixture is heated for a further 3 hours under reflux. One hundred cubic centimeters of water is added, and the organic layer is decanted and extracted with 50 cubic centimeters of 10% hydrochloric acid. The aqueous acid layer then is decanted, 25 cubic centimeters of sodium hydroxide solution ($d=1.33$) is added, and the base is extracted with two 25 cubic centimeter volumes of chloroform which then is decanted, washed and dried over sodium sulphate. There is obtained about 18 grams of the base boiling at 200°–235° C. under a pressure of 0.6 millimeters of mercury. Following purification by recrystallisation from 25 cubic centimeters of ethanol, there is obtained about 10 grams of 10-(2,3-bispiperidino-1-propyl)-phenthiazine, which is found to melt at 108° C.

1,3-bispiperidino-2-chloro-propane dihydrochloride is obtained by treating 22.5 grams of 1,3-bispiperidino-2-propanol in 70 cubic centimeters of chloroform with gaseous hydrogen chloride, followed by 18 grams of thionyl chloride. On crystallisation from isopropanol, there is obtained about 21 grams of 1,3-bispiperidino-2-chloropropane dihydrochloride, which is found to melt at 220° C.

1,3-bispiperidino-2-propanol may be prepared by heating, to 60° C., a mixture of 46 grams of epichlorhydrin, added gradually to 120 grams of piperidine, and 250 cubic centimeters of water, treating the mixture with potassium carbonate, and then extracting with benzene and ether. About 93 grams of 1,3-bispiperidino-2-propanol is obtained, which is found to boil at 178°–180° C., under a pressure of 26 millimeters of mercury.

The following may be similarly prepared:

10-[2,3-bis-(2-methylpiperidino)-1 - propyl]phenthiazine, M. P. 115° C.

10-(2,3-bis-pyrrolidino - 1 - propyl)phenthiazine, M. P. 125° C.

10-(2,3-bis-morpholino - 1 - propyl)phenthiazine, M. P. 140° C.

10-(2,3-bis-hexamethyleneimino-1 - propyl)phenthiazine, the dihydrochloride of which melts at 200° C.

10-[2,3-bis-(4-methyl-1-piperazinyl) - 1 - propyl]phenthiazine, liquid distilling at 215°–200° C. at 1 mm. Hg.

Example V

Approximately 30.3 grams of 9,9-dioxyphenthiazine is dissolved in 200 cubic centimeters of dimethyl formamide, 9.3 grams of sodium ethylate is added and the mixture is distilled until the temperature of the distillate remains constant at 150° C. A solution of 27 grams of 1,3-bis(dimethylamino)-2-chloro-propane in 100 cubic centimeters of dimethyl formamide is added and the mixture is heated under reflux for 10 hours. It is then poured into water and extracted with ether, and the ethereal solution is dried over anhydrous potassium carbonate. On evaporation of the solvent, there is obtained about 28 grams of a residue which is purified by crystallisation from ethanol and then from benzene. There is thus obtained about 12 grams of 9,9-dioxy-10-[2,3-bis(dimethylamino)-1-propyl]-phenthiazine which is found to melt at 127°–128° C.

Having thus described the subject matter of this invention, what it is desired to secure by Letters Patent of the United States is:

As a new composition of matter 9,9-dioxy-10-(2,3-bis-piperidino-1-propyl)phenthiazine.

References Cited in the file of this patent

UNITED STATES PATENTS

| | | |
|---|---|---|
| 2,534,237 | Cusic | Dec. 19, 1950 |
| 2,590,125 | Robinson | Mar. 25, 1952 |
| 2,789,978 | Rath | Apr. 23, 1957 |

FOREIGN PATENTS

| | | |
|---|---|---|
| 1,060,189 | France | Nov. 18, 1953 |

OTHER REFERENCES

Dahlbom et al.: "Acta Chem. Scand.," vol. 5 (1951), pp. 102, 104, 105, 107, 112, and 113.